(12) United States Patent
Baccouche et al.

(10) Patent No.: US 11,485,214 B2
(45) Date of Patent: Nov. 1, 2022

(54) FRAME-MOUNTED BATTERY ENCLOSURE

(71) Applicant: Ford Global Technologies, LLC, Dearborn, MI (US)

(72) Inventors: Mohamed Ridha Baccouche, Ann Arbor, MI (US); Fubang Wu, Woodhaven, MI (US); Guosong Li, Novi, MI (US); Saeed David Barbat, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/086,531

(22) Filed: Nov. 2, 2020

(65) Prior Publication Data

US 2022/0134857 A1   May 5, 2022

(51) Int. Cl.
*B60K 1/04* (2019.01)
*B62D 21/02* (2006.01)
*H01M 50/20* (2021.01)
*B62D 21/15* (2006.01)

(52) U.S. Cl.
CPC .............. *B60K 1/04* (2013.01); *B62D 21/02* (2013.01); *H01M 50/20* (2021.01); *B60K 2001/0438* (2013.01); *B62D 21/157* (2013.01); *H01M 2220/20* (2013.01)

(58) Field of Classification Search
CPC ......... B60K 1/04; H01M 50/20; B62D 21/02; B60L 50/62; B60L 2240/423; B60L 2240/441; B60L 2240/443; B60L 2240/54
See application file for complete search history.

(56) References Cited

U.S. PATENT DOCUMENTS

| 7,641,236 | B2* | 1/2010 | Yasuhara ............. B62D 21/06 280/795 |
| 8,608,230 | B2 | 12/2013 | Young et al. |
| 9,102,362 | B2* | 8/2015 | Baccouche ............. B60K 1/04 |
| 2020/0207198 | A1 | 7/2020 | Baccouche et al. |

FOREIGN PATENT DOCUMENTS

DE  1020181105109 A1   11/2019
KR  1020120062260 A    6/2012

* cited by examiner

*Primary Examiner* — Jonathan Ng
*Assistant Examiner* — James J Triggs
(74) *Attorney, Agent, or Firm* — Greg Brown; Bejin Bieneman PLC

(57) ABSTRACT

A vehicle includes a vehicle frame having a first frame rail and a second frame rail spaced from each other. The vehicle frame includes a cross-member extending from the first frame rail to the second frame rail. A battery enclosure extends from the first frame rail to the second frame rail. The battery enclosure includes a first side member and a second side member. The first side member is connected to and deformable relative to the first frame rail. The second side member is connected to and deformable relative to the second frame rail. The battery enclosure includes a reinforcement connected to the first side member, the second side member, and the cross-member.

20 Claims, 8 Drawing Sheets

FRAME-MOUNTED BATTERY ENCLOSURE

BACKGROUND

A battery-electric vehicle includes one or more batteries that power the vehicle, including propulsion of the vehicle. For example, wheels of the vehicle are powered by electric motors that are powered by the batteries. The battery is stored in a battery compartment that may be, for example, under a passenger cabin of the vehicle. In such an example, the battery compartment may span the entire cross-vehicle width of the vehicle underbody.

DETAILED DESCRIPTION

Figure 1:
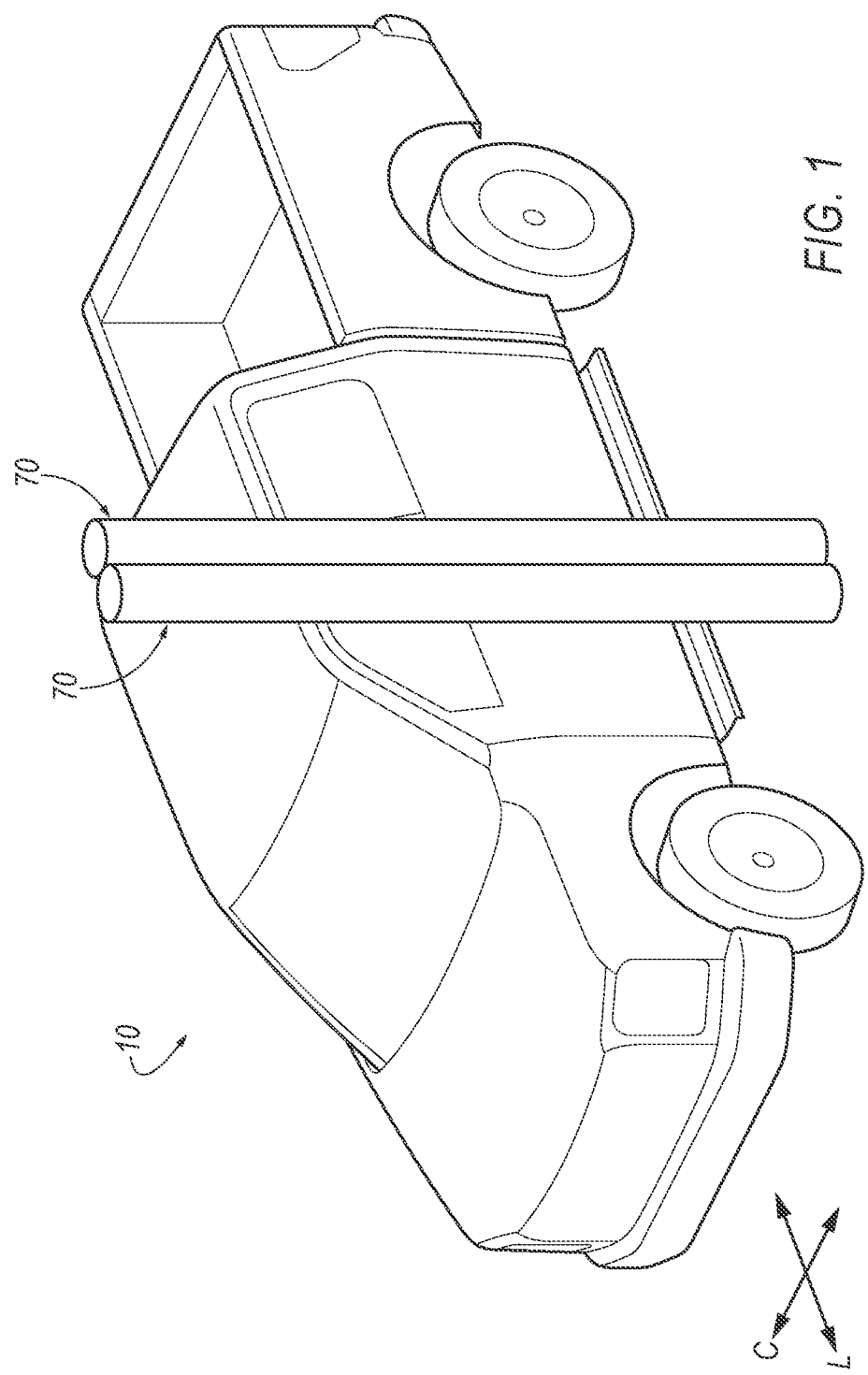
FIG. 1 is a perspective view of a vehicle and two examples of pole location during a side impact test.
Figure 2:
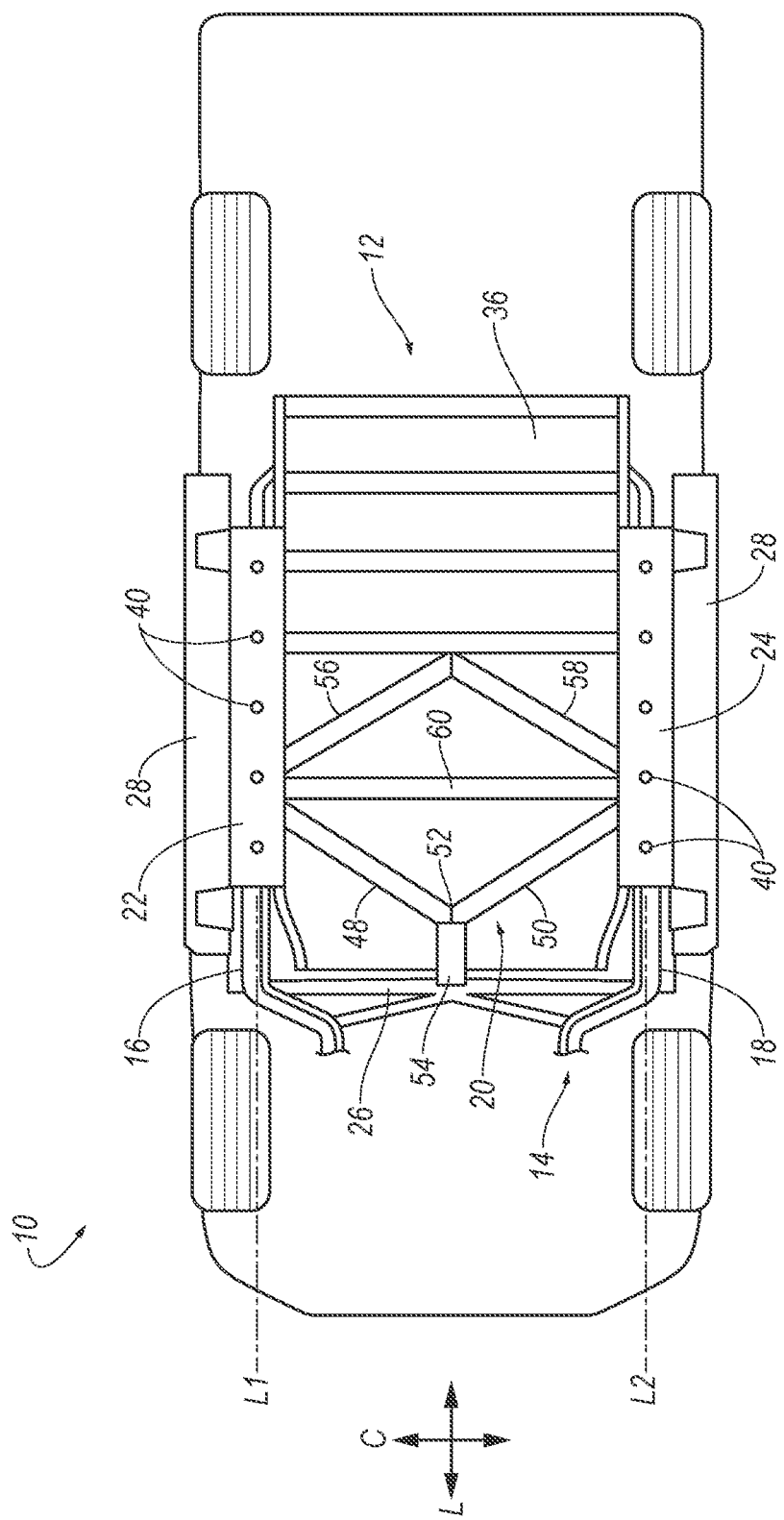
FIG. 2 is a bottom view of the vehicle.

A vehicle includes a vehicle frame having first frame rail and a second frame rail spaced from each other. The vehicle frame includes a cross-member extending from the first frame rail to the second frame rail. A battery enclosure extends from the first frame rail to the second frame rail. The battery enclosure includes a first side member and a second side member. The first side member is connected to and deformable relative to the first frame rail and the second side member is connected to and deformable relative to the second frame rail. The battery enclosure includes a reinforcement connected to the first side member, the second side member, and the cross-member.

The reinforcement may include a first beam extending vehicle-forward and inboard from the first side member toward the cross-member and a second beam extending vehicle-forward and inboard from the second side member toward the cross-member. The first beam and the second beam may be arranged in a V-shape. The first beam and the second beam may meet at a vertex, and the reinforcement may include a third beam extending from the vertex toward the cross-member. The reinforcement may include a first rearward beam extending vehicle-rearward and inboard from the first side member and a second rearward beam extending vehicle-rearward and inboard from the second side member to the first rearward beam.

The first side member and the second side member may be elongated along longitudinal axes and may each include hollow cavities elongated along the longitudinal axes. The reinforcement may include a first beam extending vehicle-forward and inboard from the first side member toward the cross-member and a second beam extending vehicle-forward and inboard from the second side member toward the cross-member.

The first side member may include a channel elongated along a longitudinal axis of the first side member and the second side member may include a channel elongated along a longitudinal axis of the second side member, the first frame rail being in the channel of the first side member and the second frame rail being in the channel of the second side member. The first side member may include hollow cavities elongated along the longitudinal axis of the first side member and the second side member may include hollow cavities elongated along the longitudinal axis of the second side member. The battery enclosure may include a battery above the reinforcement, at least some of the hollow cavities of the first side member may be between the first frame rail and the battery, and at least some of the hollow cavities of the second side member may be between the second frame rail and the battery. The first side member and the second side member may each include an inboard section inboard of the channel, and outboard section outboard of the channel, and a bottom section extending from the inboard section to the outboard section below the channel. The reinforcement may be connected to the inboard section of the first side member and the inboard section of the second side member. The inboard sections may include hollow cavities elongated along the longitudinal axis of the first side member and the second side member. Fasteners may engage the bottom section of the first side member and the first frame rail and fasteners may engage the bottom section of the second side member and the second frame rail.

The battery enclosure may include a bottom panel extending from the first side member to the second side member above the reinforcement and a battery supported by the bottom panel.

A vehicle-battery enclosure includes a first side member and a second side member spaced from each other and each elongated along a respective longitudinal axis. The first side member may include hollow cavities elongated along the longitudinal axis of the first side member and the second side member may include hollow cavities elongated along the longitudinal axis of the second side member. A reinforcement may include a first beam extending from the first side member vehicle-forward and inboard and a second beam extending from the second side member vehicle-forward and inboard to the first beam, the first beam and the second beam being arranged in a V-shape.

The reinforcement may include a first rearward beam extending vehicle-rearward and inboard from the first side member and the first beam and a second rearward beam extending vehicle-rearward and inboard from the second side member and the first rearward beam to the first beam. The first side member may include a channel elongated along the longitudinal axis of the first side member and the second side member may include a channel elongated along the longitudinal axis of the second side member. The first side member and the second side member each may include an inboard section inboard of the channel, an outboard section outboard of the channel, and a bottom extending from the inboard section to the outboard section below the channel. The first beam of the reinforcement may be connected to the inboard section of the first side member and the second beam of the reinforcement may be connected to the inboard section of the second side member. At least some of the hollow cavities may be in the inboard sections.

With reference to the figures, where like numerals indicate like parts, a vehicle 10 including a battery enclosure 12 is generally shown. The vehicle 10 includes a vehicle frame 14 having first frame rail 16 and a second frame rail 18 spaced from each other. The vehicle frame 14 includes a cross-member 26 extending from the first frame rail 16 to the second frame rail 18. The battery enclosure 12 extends from one of the frame rails to the other of the frame rails. The battery enclosure 12 includes a first side member 22 and a second side member 24. The first side member 22 is connected to and deformable relative to the first frame rail 16 and the second side member 24 is connected to and deformable relative to the second frame rail 18. The battery enclosure 12 includes a reinforcement 20 connected to the first side member 22, the second side member 24, and the cross-member 26.

The battery enclosure 12 absorbs and distributes energy during a vehicle side impact to reduce the likelihood of damage to a battery (not shown) supported by the battery enclosure 12. Specifically, since the first side member 22 is deformable relative to the first frame rail 16, the deformation of the first side member 22 relative to the first rail absorbs energy during a vehicle-side impact at the first side member 22. Since the reinforcement 20 is connected to the first side member 22 and the cross-member 26, force from the vehicle-side impact is distributed by the reinforcement 20 from the first side member 22 to the cross-member 26 and from the cross-member 26 to the first frame rail 16 and the second frame rail 18. This absorption of energy and distribution of force reduces force delivery to the battery during a vehicle-side impact. Similar energy absorption and load distribution occurs during a vehicle-side impact at the second side member 24.

Figure 3:
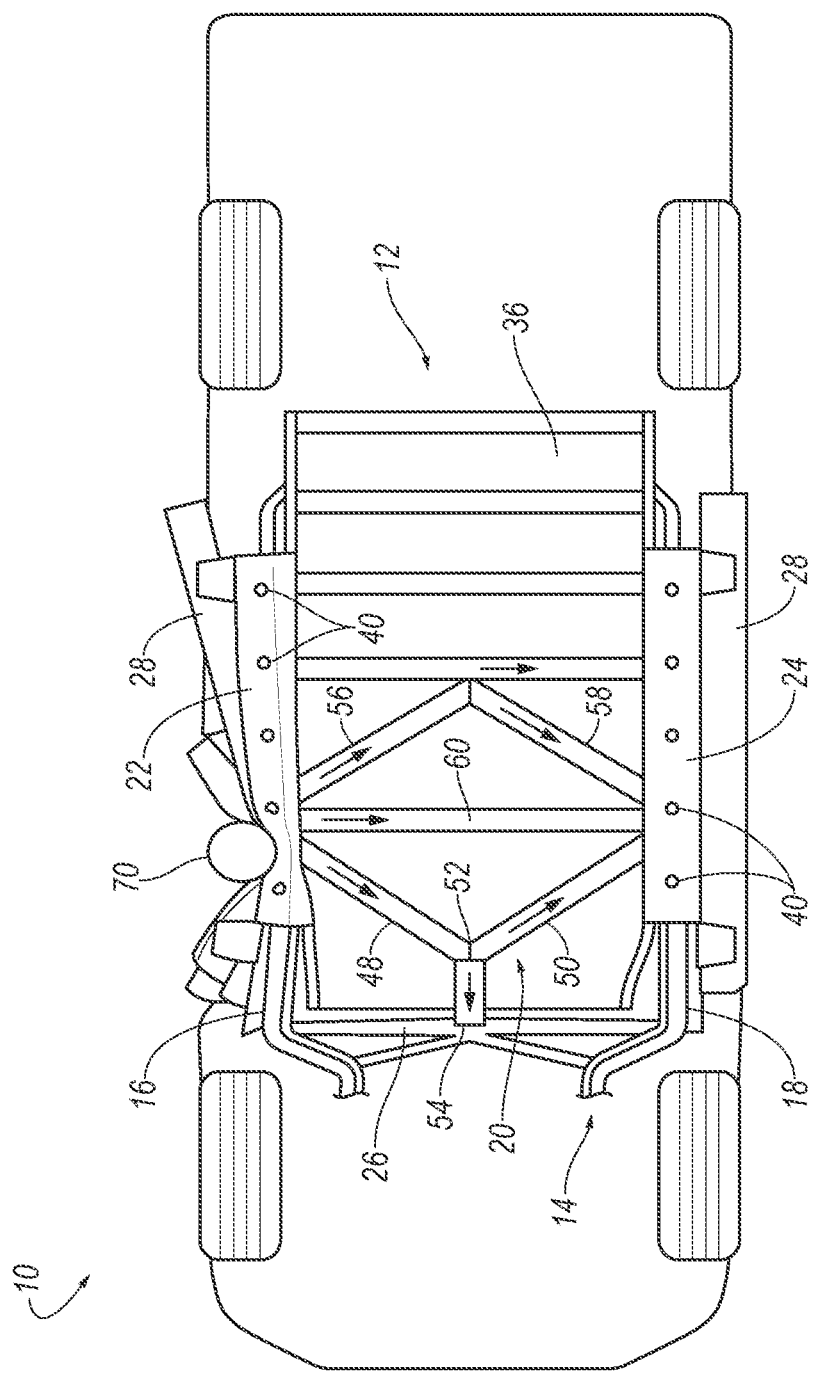
FIG. 3 is a bottom view of the vehicle during a side impact with one of the poles shown in FIG. 1.
Figure 4:
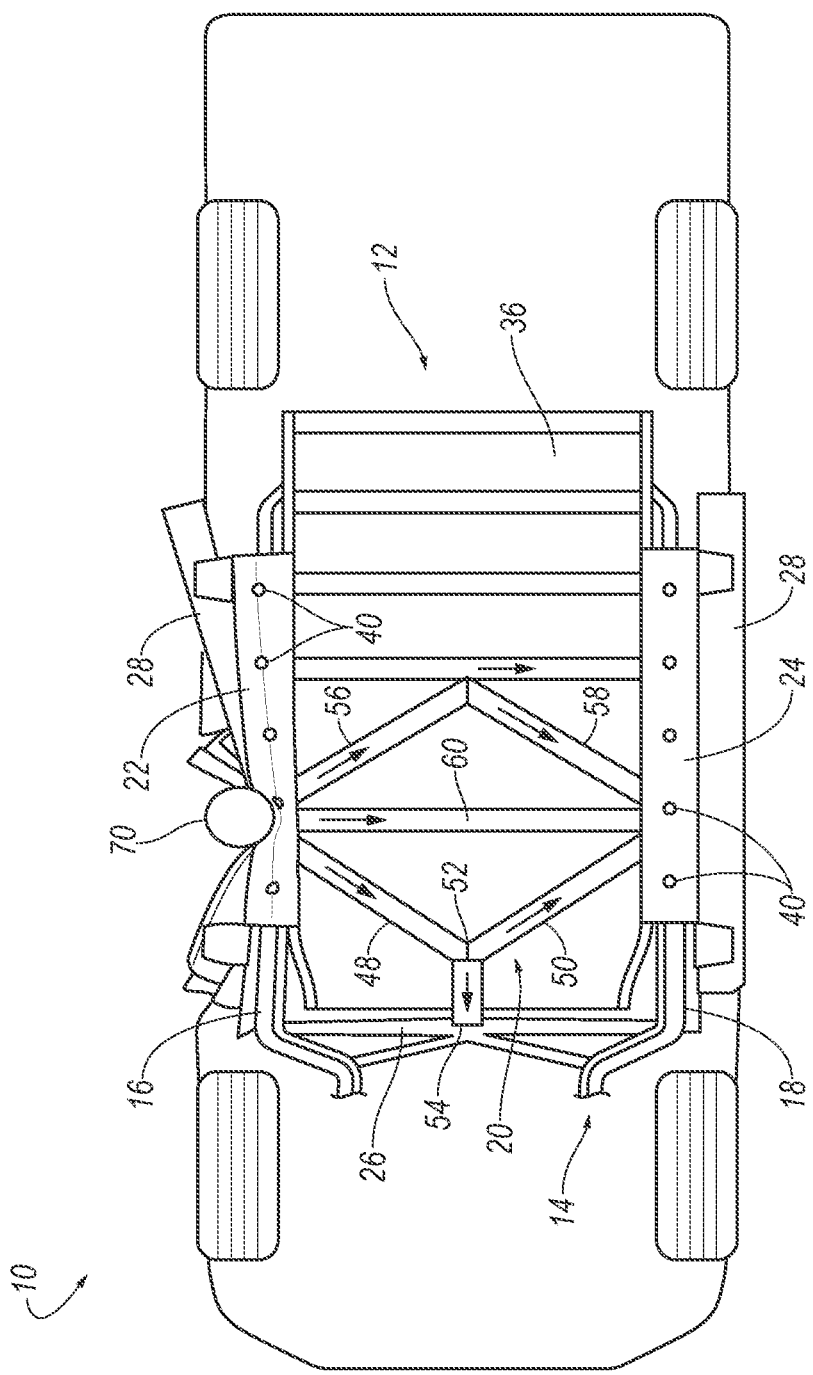
FIG. 4 is a bottom view of the vehicle during a side impact with the other of the poles shown in FIG. 1.

A vehicle-side impact is an impact of a side of the vehicle 10 that results in a cross-vehicle force vector. One example of a vehicle-side impact is the pole test by the National Highway and Traffic Safety Administration (NHTSA). In the NHTSA pole test, the vehicle 10 slides sideways at 20 mph and a 75-degree angle into a 10-inch-diameter rigid pole. Examples of impact of the pole at two different locations of the vehicle 10 are shown in FIG. 1. One of the examples is also shown in FIG. 3 and the other of the examples is also shown in FIG. 4.

With reference to FIGS. 1-4, the vehicle 10 may be any suitable type of automobile, e.g., a passenger or commercial automobile such as a sedan, a coupe, a truck, a sport utility, a crossover, a van, a minivan, a taxi, a bus, etc. The vehicle 10, for example, may be autonomous. In other words, the vehicle 10 may be autonomously operated such that the vehicle 10 may be driven without constant attention from a driver, i.e., the vehicle 10 may be self-driving without human input. As described further below, the vehicle 10 includes the battery that powers propulsion of the vehicle 10, e.g., the vehicle 10 may be battery-electric (BEV), hybrid electric, plug-in hybrid electric (PHEV), etc.

With continued reference to FIGS. 1-4, the vehicle 10 includes the vehicle frame 14. The vehicle frame 14 may be of a unibody construction in which the vehicle frame 14 is unitary with a vehicle 10 body (including frame rails, pillars, roof rails, etc.). As another example, the vehicle 10 body and the vehicle frame 14 may have a body-on-frame construction (also referred to as a cab-on-frame construction) in which the vehicle 10 body and the vehicle frame 14 are separate components, i.e., are modular, and the vehicle 10 body is supported on and affixed to the vehicle frame 14. Alternatively, the vehicle frame 14 and the vehicle 10 body may have any suitable construction. The vehicle frame 14 and the vehicle 10 body may be of any suitable material, for example, steel, aluminum, and/or fiber-reinforced plastic, etc.

The vehicle frame 14 includes a plurality of rails and/or members. Specifically, the vehicle frame 14 includes the first frame rail 16 and the second frame rail 18. The first frame rail 16 and the second frame rail 18 may be tubular. As an example, the first frame rail 16 and the second frame rail 18 may be hydroformed.

The first frame rail 16 and the second frame rail 18 are spaced from each other in a cross-vehicle direction, i.e., along a cross-vehicle axis C. Specifically, the first frame rail 16 and the second frame rail 18 may define the vehicle outboard boundaries of the vehicle frame 14. The first frame rail 16 and the second frame rail 18 may be aligned cross-vehicle with wheel wells and wheels of the vehicle 10, i.e., extending from one wheel well to another wheel well on a common side of the vehicle 10. The vehicle 10 may include rockers 28 (see FIG. 8) elongated along a vehicle-longitudinal axis L below doors of the vehicle 10 and the first frame rail 16 and the second frame rail 18 may be adjacent the rockers 28, respectively. The rockers 28 may be fixed to and/or supported by the first frame rail 16 and the second frame rail 18, respectively. The battery enclosure 12 is disposed between the first frame rail 16 and the second frame rail 18.

The first frame rail 16 and the second frame rail 18 are elongated in a vehicle-longitudinal direction, i.e., along the vehicle longitudinal axis L. The first frame rail 16 and the second frame rail 18 may be elongated at least from one wheel well to another wheel well. In addition, the first frame rail 16 and the second frame rail 18 may extend forward of a front wheel well and rearward of a rear wheel well, e.g., by extending inboard and/or above the wheel well. The first frame rail 16 may be unitary from a vehicle-forward end to a vehicle-rearward end of the first frame rail 16 and the second frame rail 18 may be unitary from a vehicle-forward end to a vehicle-rearward end of the second frame rail 18.

The vehicle frame 14 includes at least one cross-member 26 extending from the first frame rail 16 to the second frame rail 18. The cross-member 26 may be tubular. The cross-member 26 is vehicle-forward of the battery enclosure 12. The vehicle frame 14 may include other cross-members extending cross-vehicle at various locations along the vehicle-longitudinal axis L.

The cross-member 26 may be fixed directly to the first frame rail 16 and the second frame rail 18, e.g., by welding, fastening, etc. The cross-member 26 may be unitary from the first frame rail 16 to the second frame rail 18, i.e., a single, uniform piece of material with no seams, joints, fasteners 40, or adhesives holding it together. A unitary component is formed as a single continuous unit, e.g., by molding, forging, casting, machining from a unitary blank, etc. Non-unitary components, in contrast, are formed separately and subsequently assembled, e.g., by threaded engagement, welding, etc.

Figure 5:
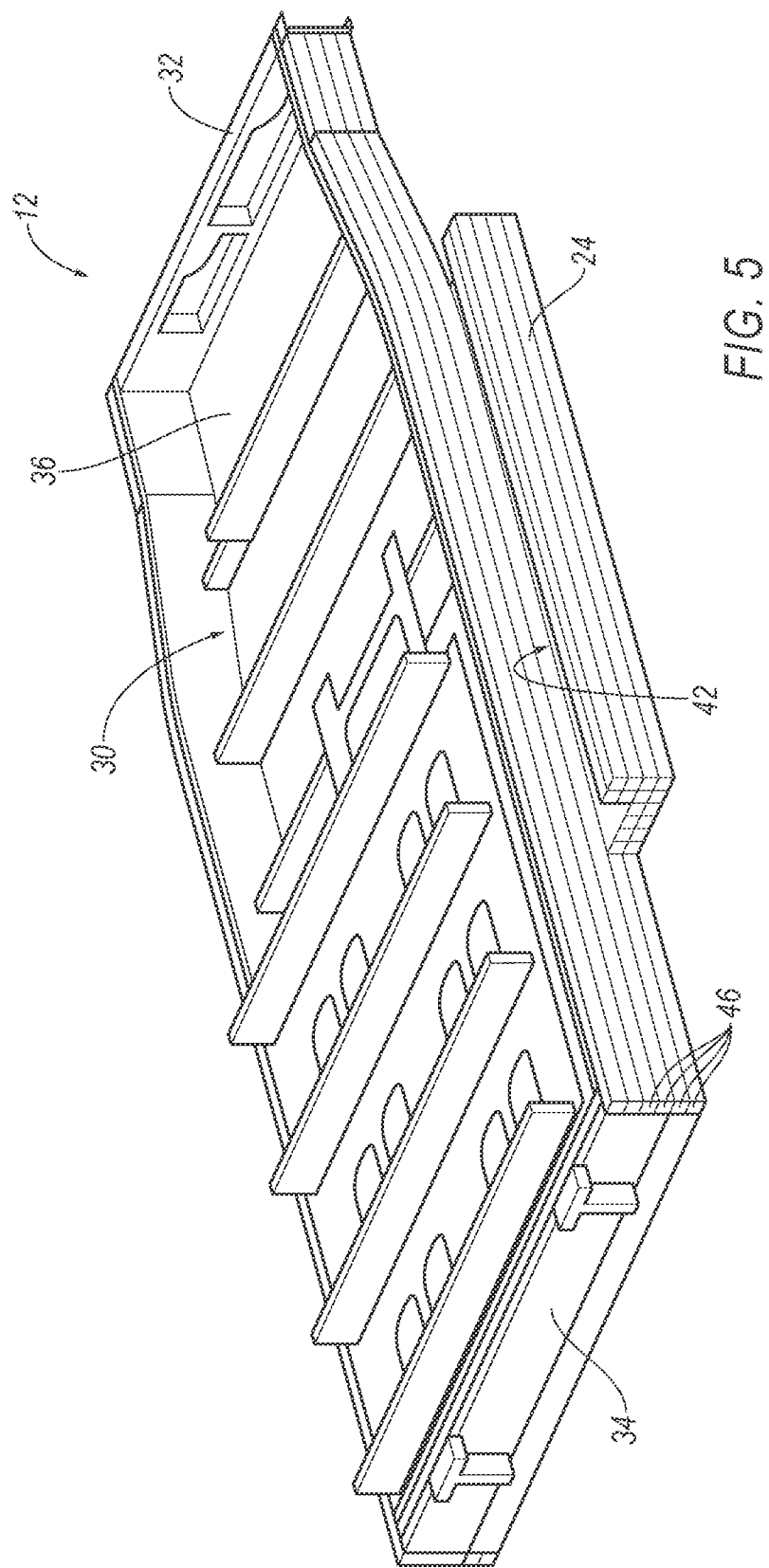
FIG. 5 is a perspective view of a battery enclosure of the vehicle.
Figure 6:
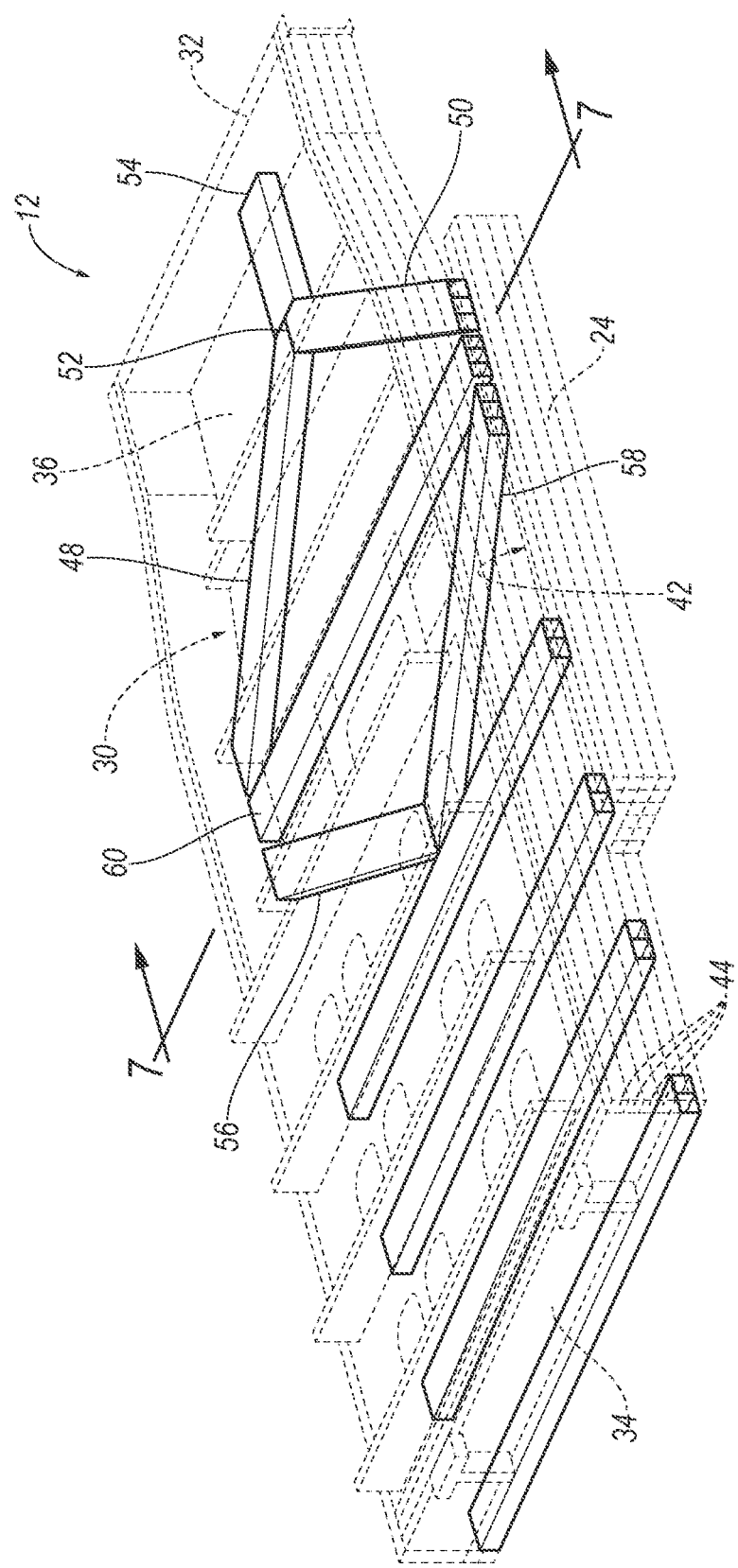
FIG. 6 is the perspective view of FIG. 5 with some components shown in broken lines.
Figure 7:
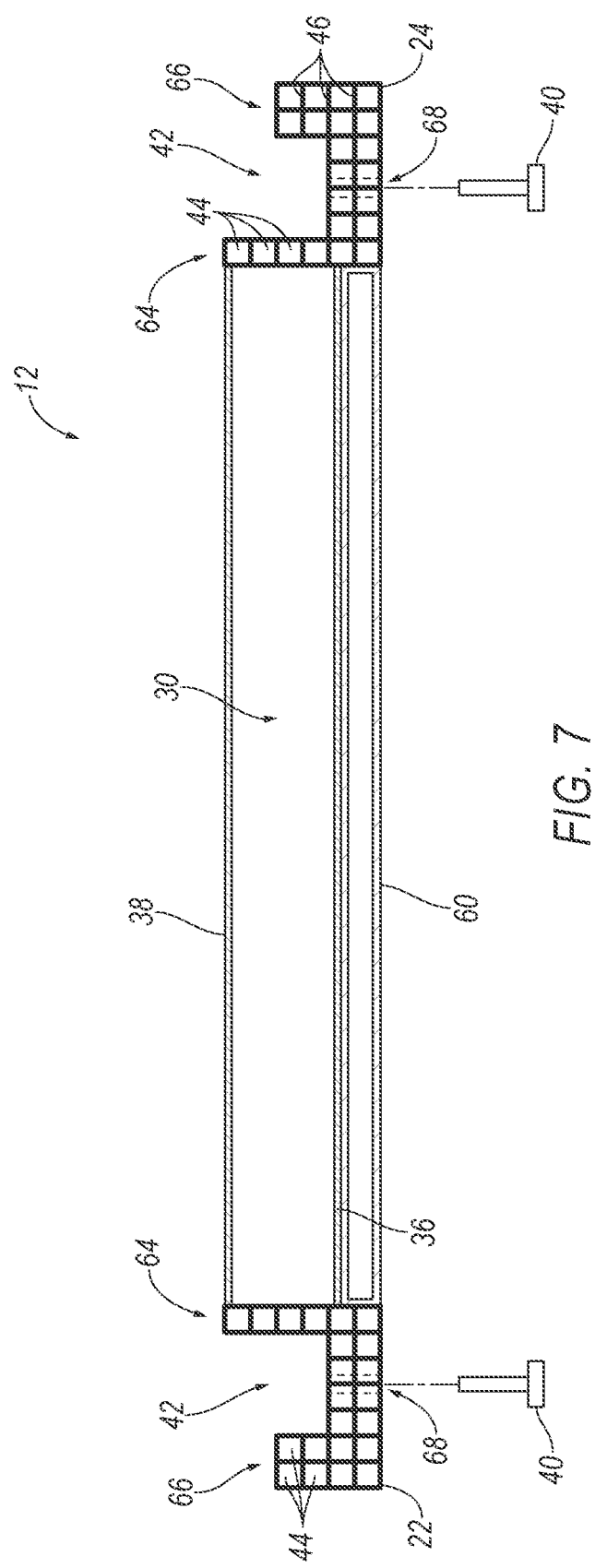
FIG. 7 is a cross-section of the battery enclosure along line 7 in FIG. 6.

With reference to FIGS. 5-7, the battery enclosure 12 defines a battery compartment 30 that houses one or more batteries (not shown). The battery compartment 30 may be generally rectangular, or any suitable shape. The battery enclosure 12 may be metal or any suitable materiel. The battery enclosure 12 is supported by the vehicle frame 14, as described further below. Additionally or alternatively, one or more intermediary structures, e.g., beams, brackets, etc., may fix the battery enclosure 12 to the vehicle frame 14. The battery compartment 30 may be the lowermost component of the vehicle 10 at the location of the battery compartment 30. In other words, no other components are below the battery compartment 30 and the battery compartment 30 is exposed to the driving surface below the vehicle 10.

The battery enclosure 12 extends from the first frame rail 16 to the second frame rail 18. The battery enclosure 12 may be continuous from the first frame rail 16 to the second frame rail 18. Specifically, the battery enclosure 12 may span the entire underbody of the vehicle 10 from the first frame rail 16 to the second frame rail 18. The battery enclosure 12 supports one or more batteries, as described further below. The battery enclosure 12 supports hardware associated with the batteries such as wiring, cooling hardware, mounting hardware, etc.

The battery enclosure 12 includes the first side member 22 and the second side member 24. The battery compartment 30 is defined between the first side member 22 and the second side member 24. The first side member 22 and the second side member 24 may define outboard boundaries of the battery compartment 30, as shown in the example in the figures. As another example, the battery enclosure 12 may include intermediate components between the first side member 22 and the battery compartment 30 and/or the second side member 24 and the battery compartment 30.

The battery enclosure 12 may include a front wall 32 and/or a rear wall 34 extending from the first side member 22 and the second side member 24. In the example shown in the figures, the battery compartment 30 is disposed between the front wall 32 and the rear wall 34. Specifically, the battery compartment 30 is disposed between the first side member 22, the second side member 24, the front wall 32, and the rear wall 34. In examples including the front wall 32 and the rear wall 34, the front wall 32 and the rear wall 34 may be fixed to the first side member 22 and the second side member 24, e.g., by fasteners 40 and/or welding.

With reference to FIG. 7, the battery enclosure 12 may include a bottom panel 36 and/or a top panel 38. The top panel 38 is not shown in FIGS. 5 and 6 to illustrate the battery compartment 30. The bottom panel 36 and the top panel 38 may be fixed to the first side member 22, the second side member 24, the front wall 32, and/or the rear wall 34 to enclose the battery. In such an example, the battery compartment 30 is defined between the bottom panel 36 and the top panel 38. The bottom panel 36 may be exposed to the road surface and may prevent intrusion of precipitation and dirt to the battery modules. The bottom panel 36 may extend from the first side member 22 to the second side member 24 above the reinforcement 20 and the battery, i.e., in the battery compartment 30, is supported by the bottom panel 36. In other words, the battery and the battery compartment 30 are above the reinforcement 20.

The top panel 38 may separate the battery compartment 30 from components of the vehicle 10 above the battery enclosure 12, e.g., a passenger compartment. The bottom panel 36 and the top panel 38 may be fixed to the first side member 22, the second side member 24, the front wall 32, and/or the rear wall 34, e.g., by fasteners 40 and/or welding. The first side member 22, the second side member 24, front wall 32, rear wall 34, bottom panel 36, and top panel 38 may be sealed to each other such that the battery compartment 30 is environmentally sealed, i.e., to prevent intrusion of road precipitation and dirt. The top panel 38 may be sandwiched between the floor of the passenger compartment and the first side member 22 and second side member 24. As another example, the top panel 38 may be the floor of the passenger compartment.

As set forth above, the battery enclosure 12 is supported by the vehicle frame 14. Additionally or alternatively, one or more intermediary structures, e.g., beams, brackets, etc., may fix the battery enclosure 12 to the vehicle frame 14.

Figure 8:
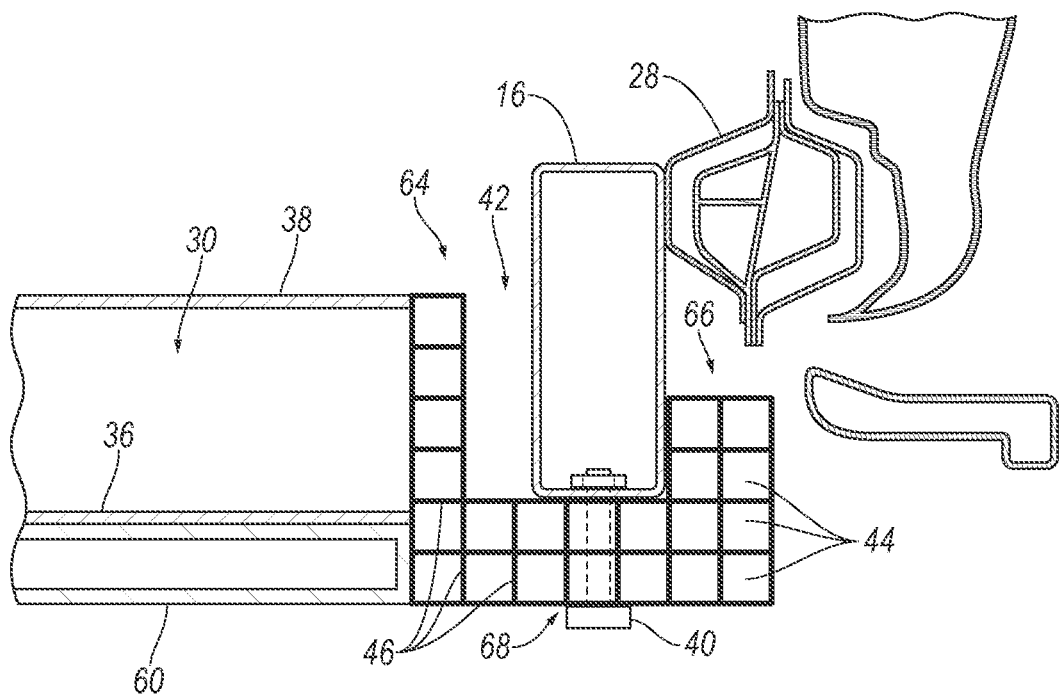
FIG. 8 is a cross-section of a portion of the vehicle through the battery enclosure and a vehicle frame.

The first side member 22 of the battery enclosure 12 is connected to the first frame rail 16 and the second side member 24 of the battery enclosure 12 is connected to the second frame rail 18. For example, as shown in FIGS. 2-4, 7, and 8, the first side member 22 and the second side member 24 may include holes that align with holes in the first frame rail 16 and the second frame rail 18, respectively, through which fasteners 40 engage the first side member 22 to the first frame rail 16 and connect the second side member 24 to the second frame rail 18. The fasteners 40 may be, for example, threaded. the first frame rail 16 and second frame rail 18 and/or the first side member 22 and second side member 24 may include weld nuts to engage threads of the fastener 40. As another example, the fasteners 40 may include a flexible battery mount (not shown). In such an example, fastener 40 may include both a threaded fastener (such as is shown in FIGS. 7-8) and the flexible battery mount. The flexible battery mount may be disposed between the threaded fastener and the frame rail 16, 18 to dampen vibration between the frame rail 16, 18 and the battery enclosure 12. Specifically, the flexible battery mount may be designed to isolate the battery enclosure 12 from road vibration. The flexible batter mount may be, for example, rubber, such as a silicone-based rubber.

The battery enclosure 12 may be fixed to the vehicle 10 as a unit. For example, the first side member 22 and the second side member 24 may be fixed to the vehicle frame 14, as described above, and the other components of the battery enclosure 12 may be supported by the first frame member and the second frame member. As an example, the engagement of the fasteners 40 may support the first side member 22 and the second side member 24 on the vehicle frame 14 and the rest of the components of the battery enclosure 12 may be supported by the first side member 22 and the second side member 24.

With reference to FIGS. 5-8, the first side member 22 can include a channel 42 elongated along a longitudinal axis L1 of the first side member 22 and the second side member 24 can include a channel 42 elongated along a longitudinal axis L2 of the second side member 24. With reference to FIG. 8, the first frame rail 16 is in the channel 42 of the first side member 22 and the second frame rail 18 is in the channel 42 of the second side member 24.

Figure 9:
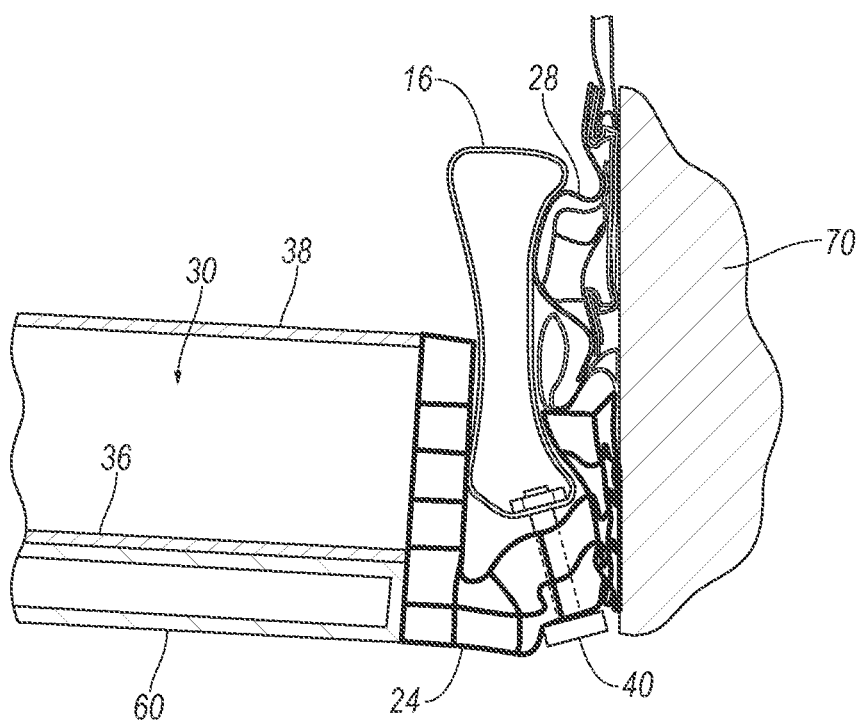
FIG. 9 is the cross-section of FIG. 8 during a vehicle side impact.

The first side member 22 is deformable relative to the first frame rail 16 and the second side member 24 is deformable relative to the second frame rail 18. In other words, the first side member 22 deforms more easily than the first frame rail 16 during a vehicle-side impact and the second side member 24 deforms more easily than the second frame rail 18 during a vehicle-side impact. As shown in FIGS. 3-4 and 8-9, the first side member 22 and the first frame rail 16 and the second side member 24 and the second frame rail 18 may be designed so that the first frame rail 16 and the second frame rail 18 do not deform during a vehicle-side impact while the first side member 22 and the second side member 24 deform during the vehicle-side impact, as shown in FIG. 9.

For example, the first side member 22 and the second side member 24 are elongated along longitudinal axes L1, L2 and each include hollow cavities 44 elongated along the longitudinal axes L1, L2. The cavities 44 are designed to crush before deformation of the first frame rail 16 and the second frame rail 18 during a vehicle-side impact. Each cavity 44 may extend through longitudinal ends of the first side member 22 and the second side member 24.

The hollow cavities 44 are cells. Each elongated cavity 44 may have the same cross-sectional shape and size. In the example shown in the figures, each cavity 44 is square-shaped in cross-section, i.e., in a cross-vehicle plane. The hollow cavities 44 are separated by walls 46. The walls 46 are thin relative to the size of the cavities 44. As an example, the walls 46 may have a wall thickness of between 3-5 mm. The first side member 22 and the second side member 24 may be formed by, for example, extrusion, to form the cavities 44. The first side member 22 and the second side member 24 may be, for example, aluminum, e.g., AL 6082T.

At least some of the hollow cavities 44 of the first side member 22 are between the first frame rail 16 and the battery, i.e., the battery compartment 30. At least some of the hollow cavities 44 of the second side member 24 are between the second frame rail 18 and the battery, i.e., the battery compartment 30. Specifically, the first side member 22 and the second side member 24 may each include an inboard section 64 inboard of the channel 42, an outboard section 66 outboard of the channel 42, and a bottom section 68 extending from the inboard section 64 to the outboard section 66 below the channel 42. In the example shown in the figures, the first side member and the second side member each include 20 cavities. Specifically, in that example, the inboard section includes six cavities (one column of six), the outboard section includes 8 cavities (two columns of four), and the bottom section includes six cavities (three columns of two). In examples including the fasteners, as described above, fasteners 40 may engage the bottom section of the first side member 22 and the first frame rail and fasteners 40 may engage the bottom section of the second side member 24 and the second frame rail.

With reference to FIGS. 2-4 and 6, the reinforcement 20 of the battery enclosure 12 connects the first side member 22 and the second side member 24 to the cross-member 26. The reinforcement 20 includes a plurality of beams. The beams may be fixed to the first side member 22 and the second side member 24 by welding, fastening, etc. In the example shown in the figures, the beams of the reinforcement 20 are connected to the first side member 22 and the second side member 24 with brackets. With reference to FIGS. 2-4 and 6, the reinforcement 20 may be connected to the inboard section 64 of the first side member 22 and the inboard section 64 of the second side member 24.

Specifically, the reinforcement 20 can include a first beam 48 extending vehicle-forward and inboard from the first side member 22 toward the cross-member 26 and a second beam 50 extending vehicle-forward and inboard from the second side member 24 toward the cross-member 26. The first beam 48 and the second beam 50 are arranged in a V-shape. The first beam 48 and the second beam 50 meet at a vertex 52. The vertex 52 may be on the longitudinal axis L of the vehicle 10. In other words, the first beam 48 and the second beam 50 may be mirror images of each other about the longitudinal axis L of the vehicle 10.

The reinforcement 20 can include a third beam 54 extending from the vertex 52 toward the cross-member 26. Specifically, the third beam 54 may extend from the vertex 52 to the cross-member 26. The third beam 54 may be connected to the cross-member, e.g., by welding, fastening, etc.

The reinforcement 20 can include a diamond pattern. Specifically, the reinforcement 20 can include a first rearward beam 56 extending vehicle-rearward and inboard from the first side member 22 and a second rearward beam 58 extending vehicle-rearward and inboard from the second side member 24 to the first rearward beam 56. The first beam 48, the second beam 50, the first rearward beam 56, and the second rearward beam 58 may be arranged in a diamond shape. In such an example, the reinforcement 20 may include a middle beam 60 between the first beam 48 and second beam 50 and the first rearward beam 56 and the second rearward beam 58. The middle beam 60 may bisect the diamond shape of the first beam 48, the second beam 50, the first rearward beam 56, and the second rearward beam 58.

The beams of the reinforcement 20, including the first beam 48, second beam 50, third beam 54, first rearward beam 56, second rearward beam 58, middle beam 60, cross-vehicle beams 62, etc., may be hollow and may include cells, as shown in FIG. 6. In such an example, the beams may have a wall thickness of between 3-5 mm. The beams may be formed by, for example, extrusion. The beams may be, for example, aluminum, e.g., AL 6082T.

The reinforcement 20 distributes loads from a vehicle-side impact to reduce the likelihood of buckling of the beams and/or deformation of the first frame rail 16 and the second frame rail 18. The load distribution is identified with arrows in FIGS. 3 and 4. In such an example, some of the load is delivered from the first side member 22 to the second side member 24 through the first beam 48 and second beam 50, through the middle beam 60, and through the first rearward beam 56 and the second rearward beam 58. Some of the load is delivered from the first side member 22 to the cross-member 26 through the first beam 48 and the third beam 54. This distribution of forces reduces the concentration of forces in the reinforcement 20 to reduce the likelihood of buckling. This distribution of forces in combination with the energy absorption by the first side member 22, as described above, reduces the likelihood and/or severity of deformation of the first frame rail 16 to increase the structural integrity of the battery enclosure 12. As shown in FIGS. 3 and 4, this also performs such operation for impact locations that vary along the longitudinal axis L of the vehicle 10.

The battery may be of any suitable type for vehicular electrification, i.e., for powering propulsion of the vehicle 10. For example, the battery may be lithium-ion batteries, nickel-metal hydride batteries, lead-acid batteries, or ultra-capacitors, as used in, for example, plug-in hybrid electric vehicles (PHEVs), hybrid electric vehicles (HEVs), or battery electric vehicles (BEVs). The batteries may be arranged as battery modules. In examples including multiple battery modules, adjacent ones of the battery modules are connected to each other. Each battery module may include one or more battery cells. The battery enclosure 12 may include a battery compartment 30 that receives the batteries.

The battery cells may be pouch cells having a flexible outer bag and electrodes, e.g., conductive foil tabs, that extend through the flexible outer bag. In such an example, the battery cells are stacked between the end plates, e.g., arranged consecutively from one end plate to the other end plate, i.e., arranged consecutively along the vehicle longitudinal axis. The end plates provide rigidity to the battery cells. The end plates are rigid relative to the flexible outer bag. The battery cells may be disposed in a casing. The end plates may be rigid relative to the casing. During a vehicle 10 impact, the end plates transfer loads between the members to limit or prevent loads on the battery cells (and on the casing in examples including the casing). The battery cells may be, for example, lithium based.

The disclosure has been described in an illustrative manner, and it is to be understood that the terminology which has been used is intended to be in the nature of words of description rather than of limitation. The adjectives "first," "second," etc., are used herein as identifiers and do not indicate order or importance. Many modifications and variations of the present disclosure are possible in light of the above teachings, and the disclosure may be practiced otherwise than as specifically described.

The invention claimed is:

1. A vehicle comprising:
a vehicle frame having a first frame rail and a second frame rail spaced from each other;
the vehicle frame including a cross-member extending from the first frame rail to the second frame rail; and
a battery enclosure extending from the first frame rail to the second frame rail;
the battery enclosure including a first side member and a second side member, the first side member being connected to and deformable relative to the first frame rail and the second side member being connected to and deformable relative to the second frame rail;
the battery enclosure including a reinforcement connected to the first side member, the second side member, and the cross-member.

2. The vehicle as set forth in claim 1, wherein the reinforcement includes a first beam extending vehicle-forward and inboard from the first side member toward the cross-member and a second beam extending vehicle-forward and inboard from the second side member toward the cross-member.

3. The vehicle as set forth in claim 2, wherein the first beam and the second beam are arranged in a V-shape.

4. The vehicle as set forth in claim 2, wherein the first beam and the second beam meet at a vertex, and the reinforcement includes a third beam extending from the vertex toward the cross-member.

5. The vehicle as set forth in claim 4, wherein the reinforcement includes a first rearward beam extending vehicle-rearward and inboard from the first side member and a second rearward beam extending vehicle-rearward and inboard from the second side member to the first rearward beam.

6. The vehicle as set forth in claim 1, wherein the first side member and the second side member are elongated along longitudinal axes and each include hollow cavities elongated along the longitudinal axes.

7. The vehicle as set forth in claim 6, wherein the reinforcement includes a first beam extending vehicle-forward and inboard from the first side member toward the cross-member and a second beam extending vehicle-forward and inboard from the second side member toward the cross-member.

8. The vehicle as set forth in claim 1, wherein the first side member includes a channel elongated along a longitudinal axis of the first side member and the second side member includes a channel elongated along a longitudinal axis of the second side member, the first frame rail being in the channel of the first side member and the second frame rail being in the channel of the second side member.

9. The vehicle as set forth in claim 8, wherein the first side member includes hollow cavities elongated along the longitudinal axis of the first side member and the second side member includes hollow cavities elongated along the longitudinal axis of the second side member.

10. The vehicle as set forth in claim 9, wherein the battery enclosure includes a battery above the reinforcement, at least some of the hollow cavities of the first side member are between the first frame rail and the battery, and at least some of the hollow cavities of the second side member are between the second frame rail and the battery.

11. The vehicle as set forth in claim 8, wherein the first side member and the second side member each include an inboard section inboard of the channel, and an outboard section outboard of the channel, and a bottom section extending from the inboard section to the outboard section below the channel.

12. The vehicle as set forth in claim 11, wherein the reinforcement is connected to the inboard section of the first side member and the inboard section of the second side member.

13. The vehicle as set forth in claim 12, wherein the inboard sections include hollow cavities elongated along the longitudinal axis of the first side member and the second side member.

14. The vehicle as set forth in claim 11, further comprising fasteners engaging the bottom section of the first side member and the first frame rail and fasteners engaging the bottom section of the second side member and the second frame rail.

15. The vehicle as set forth in claim 1, wherein the battery enclosure includes a bottom panel extending from the first side member to the second side member above the reinforcement and a battery supported by the bottom panel.

16. A vehicle-battery enclosure comprising:
a first side member and a second side member spaced from each other and each elongated along a respective longitudinal axis;
the first side member including hollow cavities elongated along the longitudinal axis of the first side member and the second side member including hollow cavities elongated along the longitudinal axis of the second side member; and
a reinforcement including a first beam extending from the first side member vehicle-forward and inboard and a second beam extending from the second side member vehicle-forward and inboard to the first beam, the first beam and the second beam being arranged in a V-shape;
the first side member includes a channel elongated along the longitudinal axis of the first side member and the second side member includes a channel elongated along the longitudinal axis of the second side member, the first side member and the second side member each including an inboard section inboard of the channel, an outboard section outboard of the channel, and a bottom extending from the inboard section to the outboard section below the channel.

17. The vehicle-battery enclosure as set forth in claim 16, wherein the reinforcement includes a first rearward beam extending vehicle-rearward and inboard from the first side member and the first beam and a second rearward beam extending vehicle-rearward and inboard from the second side member and the first rearward beam to the first beam.

18. The vehicle-battery enclosure as set forth in claim 16, wherein the first beam of the reinforcement is connected to the inboard section of the first side member and the second beam of the reinforcement is connected to the inboard section of the second side member.

19. The vehicle-battery enclosure as set forth in claim 18, wherein at least some of the hollow cavities are in the inboard sections.

20. A vehicle-battery enclosure comprising:
a first side member and a second side member spaced from each other and each elongated along a respective longitudinal axis;
the first side member including hollow cavities elongated along the longitudinal axis of the first side member and the second side member including hollow cavities elongated along the longitudinal axis of the second side member; and a reinforcement including a first beam extending from the first side member vehicle-forward and inboard and a second beam extending from the second side member vehicle-forward and inboard to the first beam, the first beam and the second beam being arranged in a V-shape;

wherein at least some of the cavities have the same cross-sectional shape and size and are arranged in rows and columns in a plane transverse to the longitudinal axes of the first side member and the second side member.

* * * * *